G. CORNWALL.
Sewer Pipe and Trap.
No. 213,394  Patented Mar. 18, 1879.
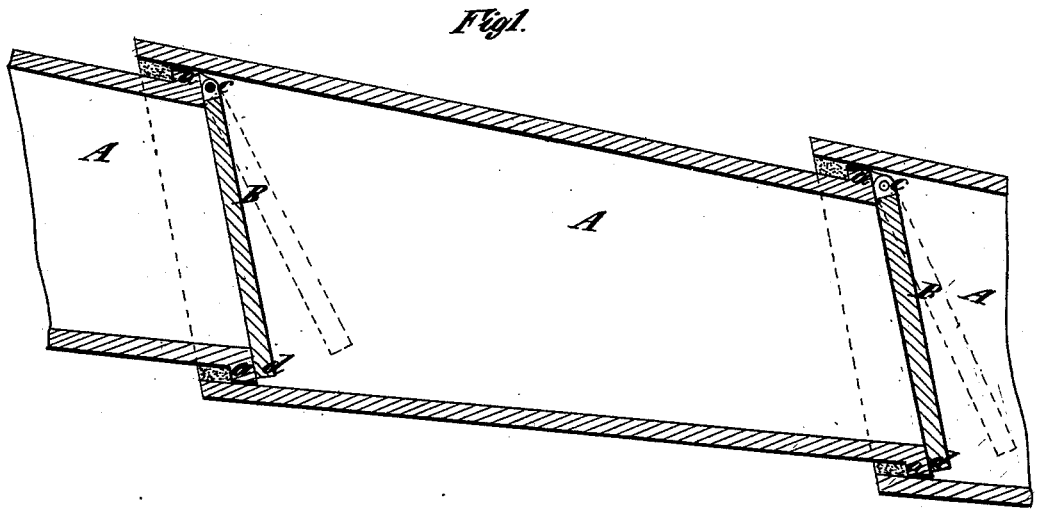
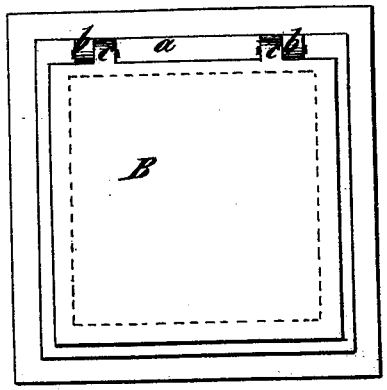

UNITED STATES PATENT OFFICE.

GEORGE CORNWALL, OF NEW YORK, N. Y.

IMPROVEMENT IN SEWER PIPE AND TRAP.

Specification forming part of Letters Patent No. 213,394, dated March 18, 1879; application filed February 8, 1879.

*To all whom it may concern:*

Be it known that I, GEORGE CORNWALL, of the city, county, and State of New York, have invented certain new and useful Improvements in Sewer Pipe and Trap, of which the following is a specification:

The object of my invention is to produce a sewer-pipe in which the several sections may be readily and securely connected together, and which is provided with traps of simple construction for preventing gases from flowing back through the pipe.

My invention consists in the novel combination of a hinged trap or traps with a sewer-pipe made of flanged taper sections, whereby a very effective provision is made for the passing off of solid substances through the pipe, and yet the entrance of gases from the sewer through the pipe to the interior of a building is effectually prevented.

In the accompanying drawings, Figure 1 represents a longitudinal section of a portion of a sewer-pipe embodying my invention, and Fig. 2 an end view of one of the sections thereof and a face view of a valve hinged thereto.

Similar letters of reference designate corresponding parts in both figures.

A designates the sections of which the sewer-pipe is composed. They are preferably made of cast-iron, and are provided upon one end with a flange, $a$.

In order to provide for inserting the flanged end of each section in the next section, I make each section internally tapering toward the flanged end for a portion or the whole of its length, and of such size as to receive snugly within it the flanged end of the preceding pipe, which is pushed into the same until the flange touches upon all sides. The joint may then be completed by filling in outside said flange with cement or other like material, as here represented, making a water and gas tight joint. The sections A are arranged on an incline, and the flange at the end of each pipe makes a slight fall as the water flows through the pipe, as represented at $d$, and thus prevents the accumulation of solid matter.

In order to prevent the flow of gas backward through the said pipe, I employ valves B, hinged to the outer or flanged end of one or more sections, and closing against the outer end thereof, so as to be opened by the flow of water through the said pipe, as represented in dotted outline in Fig. 1, and closed by their own weight. As the valves close against the ends of the sections they are not obstructed in their action by any solid matter passing through the pipe.

I have represented the flanged face of each section as provided with lugs $b$, and the valve as provided with lugs $c$, hinged to the face of the section by the lugs $b$. By providing sections of pipe with these valves gases are precluded from flowing back through the pipe and entering the building with which the sewer-pipe is connected.

In order to permit the valve B to open properly, I preferably make the pipe rectangular in its cross-section; but, if desirable, it may have a rounded bottom with straight sides.

By my invention I produce a sewer-pipe which may be very cheaply and strongly constructed, and by which the danger to health resulting from the presence of sewer-gas in a building is prevented.

What I claim as my invention, and desire to secure by Letters Patent, is—

The combination, with a sewer-pipe composed of internally-tapering sections provided upon the smaller ends with flanges, of a valve or valves hinged to the flanged ends of one or more sections, so as to be opened by the flow of water through the said pipe and closed by their weight, substantially as specified.

GEO. CORNWALL.

Witnesses:
T. J. KEANE,
FRED. HAYNES.